US012071804B2

(12) United States Patent
Plesnik et al.

(10) Patent No.: US 12,071,804 B2
(45) Date of Patent: Aug. 27, 2024

(54) HINGE FOR CONTROLLED DOOR CLOSING AND OPENING WITH DAMPER

(71) Applicant: TURNA D.O.O., Sostanj (SI)

(72) Inventors: Ales Plesnik, Sostanj (SI); Peter Kolar, Polzela (SI); Rok Pisek, Petrovce (SI)

(73) Assignee: TURNA D.O.O., Sostanj (SI)

( * ) Notice: Subject to any disclaimer, the term of this patent is extended or adjusted under 35 U.S.C. 154(b) by 271 days.

(21) Appl. No.: 17/627,676

(22) PCT Filed: Jul. 8, 2020

(86) PCT No.: PCT/SI2020/050017

§ 371 (c)(1),
(2) Date: Jan. 16, 2022

(87) PCT Pub. No.: WO2021/010904

PCT Pub. Date: Jan. 21, 2021

(65) Prior Publication Data

US 2022/0259910 A1 Aug. 18, 2022

(30) Foreign Application Priority Data

Jul. 16, 2019 (SI) ................................ P-201900132

(51) Int. Cl.
*E05F 1/12* (2006.01)
*E05F 3/02* (2006.01)

(52) U.S. Cl.
CPC .............. *E05F 3/02* (2013.01); *E05F 1/1246* (2013.01); *E05Y 2201/254* (2013.01); *E05Y 2201/264* (2013.01); *E05Y 2900/30* (2013.01)

(58) Field of Classification Search
CPC ...... E05F 3/02; E05F 1/1246; E05Y 2900/30; E05Y 2201/264; E05Y 2201/254
See application file for complete search history.

(56) References Cited

U.S. PATENT DOCUMENTS 2,626,420 A * 1/1953 Georges .................. E05F 5/027
16/80
2,901,277 A * 8/1959 Anderson ............. E05C 19/024
292/78

(Continued)

FOREIGN PATENT DOCUMENTS

DE 102012016938 A1 9/2013
EP 2474786 A2 7/2012
WO 2019121391 A1 6/2019

*Primary Examiner* — Jason W San
(74) *Attorney, Agent, or Firm* — The Watson IP Group, PLC; Jovan N. Jovanovic

(57) ABSTRACT

The object of the invention is the hinge for controlled door closing and opening with damper which solves the technical problem of smooth and controlled closing and opening of the door before the end positions of the hinge, i.e. the open or closed position of the door. The damper fit surface (25) and the damper head fit surface (26) are always in contact with two of the limiting surfaces, i.e. two of the following: the damper stop on the housing for closing (21), the damper stop on the housing for opening (22), the damper stop on the guide for opening (23) and the damper stop on the guide for closing (24), whereby the damper (5) in the initial position constantly applies force in the direction of extension, meaning that the damper (5) constantly applies force to increase the distance between the damper fit surface (25) and the damper head fit surface (26), whereas the hinge guide (3) is dimensioned in such a way that the distance between the damper stop on the guide for opening (23) and the damper stop on the guide for closing (24) is smaller than the maximum distance between the damper fit surface (25) and the damper head fit surface (26).

6 Claims, 6 Drawing Sheets

(56) References Cited

U.S. PATENT DOCUMENTS

Figure 1:
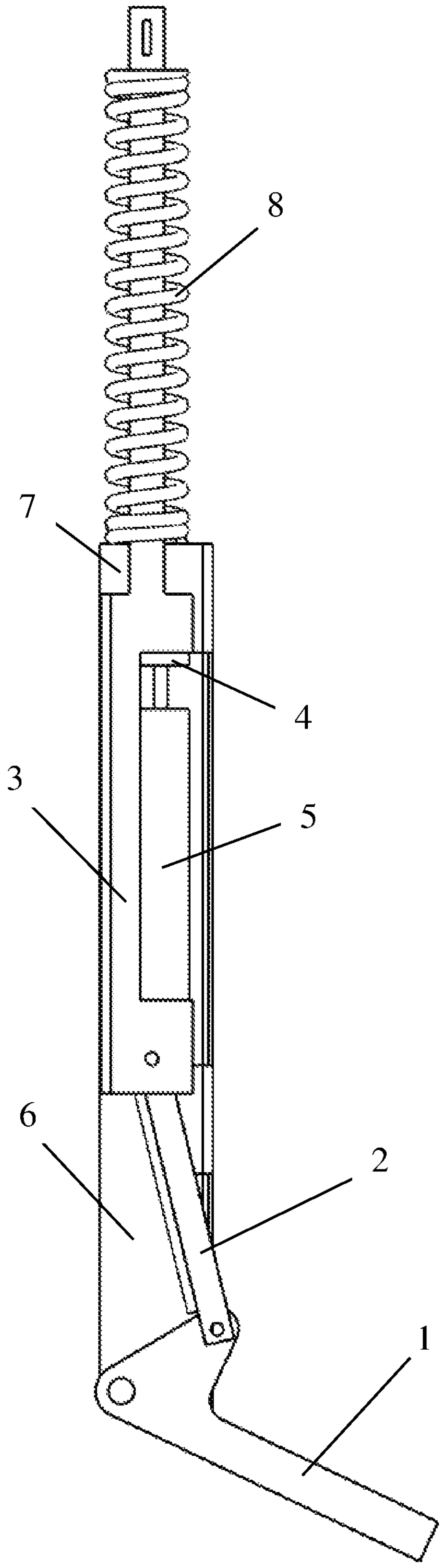

| | | | | |
|---|---|---|---|---|
| 3,503,380 | A * | 3/1970 | Vasaturo | E05F 1/1261 126/191 |
| 9,080,364 | B2 * | 7/2015 | Vanini | F24C 15/023 |
| 9,995,075 | B2 * | 6/2018 | Vanini | E05F 1/1246 |
| 10,458,167 | B2 * | 10/2019 | Collene | E05F 1/1058 |
| 10,890,334 | B2 * | 1/2021 | White | E05F 1/1261 |
| 10,907,389 | B2 * | 2/2021 | White | E05F 1/1261 |
| 2007/0283532 | A1 * | 12/2007 | Vanini | F24C 15/023 16/277 |
| 2009/0064458 | A1 * | 3/2009 | Vanini | E05F 1/1261 16/304 |
| 2014/0208542 | A1 * | 7/2014 | White | E05D 7/12 16/261 |

* cited by examiner

HINGE FOR CONTROLLED DOOR CLOSING AND OPENING WITH DAMPER

DESCRIPTION OF THE INVENTION

Field of Technology

Closing of doors on stoves and other cooking appliances; closing of doors on kitchen appliances; hinges for door closing; suspension; damping; damper.

Technical Problem

The devices for industrial or domestic use are becoming increasingly more advanced. In order to ensure competitiveness on the market, increasingly improved devices must be manufactured for reasonable costs, and appropriate components must be ensured for the assembly of such devices, the manufacturing or purchasing costs of which should allow their integration into the product.

With kitchen appliances, such as stoves, ovens, dishwashers and refrigerator and freezer units, hinges must be installed to:

- ensure the required force though the entire area of door opening, since the doors on these appliances have a rather large mass due to their dimensions. With inappropriate hinges, in particular in the event of fast door opening with the fully opened (approximately 90°) or fully closed angle (0°), a thrust on the hinges and on the appliance may occur;
- ensure a soft closing and opening of the door;
- hinges must have small dimensions, long lifetime and be affordable, while their possible servicing must be as simple as possible.

STATE OF THE ART

Door closing hinges are generally well known, since they have been on the market for decades. More advanced types of hinges have also been used for decades, both for controlled closing of builders' joinery, closing of vehicle door, as well as closing of various devices.

The doors on some devices, such as a stove and a dishwasher, open downwards, whereby the hinges must be installed on the axle or near the axle that joins the device with its door. In addition to the appropriate load-bearing capacity, the hinge must also ensure an even adjusting of the angle between the device and the device door.

WO2009033960 discloses a solution of a hinge for soft door opening or closing, where the damper is integrated into the hinge housing. When the hinge is positioned near the door closing and opening position of the hinge, a hinge guide starts to apply pressure on the hinge, whereby the damper bears the load and ensures soft door closing or opening.

EP 2474786 discloses a solution of a hinge for soft door opening or closing, whereby the damper is moving between damper stops. When the damper comes into contact with one of the damper stops, a slight thrust or discontinuity in the force inside the hinge occurs.

EP1287222 displays a solution of controlled closing of stove door. An even door closing is provided by the curved section in the latch, designed to distribute the load more evenly through the entire area of opening of the stove door. For a proper operation, an additional guide track in the hinge is installed to ensure the proper position of the guide rod. In addition, the said patent does not solve the problem of damping for soft door opening or closing. In EP2284344 and US2010148646, the problem of a more even transfer of load from the translatory movement into a suitable movement for door opening is solved by a curved section on the so-called moving arm (an added external element with a formed curved section) which allows the movement of the roller.

The device according to the invention ensures a sufficient force throughout the entire working range of the hinge and damping of thrusts before the end positions of the device or the end positions of closing or opening of the appliance door.

DESCRIPTION OF NEW INVENTION

The object of the invention is the hinge for controlled door closing and opening with damper which ensures a smooth and controlled closing and opening of the door before the end positions of the hinge, i.e. the open or closed position of the door. The object of the invention may be used for controlled closing and opening of any type of doors, wings or windows, while it is primarily designed for installation into kitchen appliances, such as a stove, an oven, a built-in cooking appliance, a dishwasher, cooling and other appliances.

The object of the invention solves the technical problem of controlled door closing and opening, whereby a damper is activated before the end positions of the door, i.e. the opened or closed position of the door, to dampen the thrusts occurring before the end positions of the door.

The object of the invention comprises also the installation of one or more dampers for reducing the loads (forces and vibrations) directed at the axles of the hinge guide. The damper is installed in such a manner to absorb mainly the loads that are generated by the closing or opening of the door and absorb the loads that are generated before the end positions of door closing or opening.

The damper contributes to a soft (gentle) closing of the door. The function of soft closing of the door is effective at the any desired angle of the door, whereby the angle depends on the construction of hinge body and hinge guide.

The damper is installed in the device according to the invention in such a manner that it does not increase the exterior dimensions of the device, but is installed in the interior of the hinge guide that is movably connected to the hinge body.

The device according to the invention is compact, robust and has few components, and comprises at least:

- a latch;
- a connecting link;
- a hinge guide;
- a damper;
- a hinge body;
- a spring fit;
- a spring;
- a pivot point of the latch, which connects the latch with the body;
- a pivot point of the connecting link.

Furthermore, the device according to the invention comprises:

- one, two or more dampers, preferably one damper;
- a damper stop on the hinge body for closing;
- a damper stop on the hinge body for opening;
- a damper stop on the hinge guide for opening;
- a damper stop on the hinge guide for closing.

The latch is rotatable in relation to the hinge body and the connecting link. Force is applied to the connecting link through the hinge guide, which causes the rotation of the latch in relation to the hinge body. The force generated by the spring is adjusted in such a way that it is balanced with the force generated by the door in motion. The damper is used to limit the movement speed of the hinge guide in certain positions, whereby the damper comes into contact with limiting surfaces (a damper stop for closing on the hinge body, a damper stop for opening on the hinge body, a damper stop for opening on the hinge guide and a damper stop for closing on the hinge guide) through the damper fit surface and the damper head fit surface. The connecting link is rotatable around its pivot point.

The contact surfaces of the damper, i.e., the damper fit surface and the damper head fit surface, are always in contact with two of the corresponding limiting surfaces, i.e., two of the corresponding damper stops. In the closed position the damper fit surface is in contact with the damper stop for closing on the hinge guide and the damper head fit surface is in contact with the damper stop for closing on the hinge body, in the opened position the damper fit surface is in contact with the damper stop for opening on the hinge body and the damper head fit surface is in contact with the damper stop for opening on the hinge guide, and in a neutral area of functioning of the hinge, the damper fit surface is constantly in contact with the damper stop for closing on the hinge guide and the damper head fit surface is constantly in contact with the damper stop for opening on the hinge guide, whereby the damper in the initial position constantly applies force in the direction of extension, meaning that the damper constantly applies force to increase the distance between the damper fit surface and the damper head fit surface, whereas the hinge guide is dimensioned in such a way that the distance between the damper stop for opening on the hinge guide and the damper stop for closing on the hinge guide is smaller than the maximum distance between the damper fit surface and the damper head fit surface. Due to a constant contact of the damper fit surface and damper head fit surface with the corresponding limiting surfaces, there are no thrusts in the initial stage of damper operation.

In the neutral area of functioning of the mechanism, the contact surfaces of the damper, i.e., the damper fit surface and the damper head fit surface, are constantly in contact with both limiting surfaces on the hinge guide, i.e., with the damper stop for opening on the hinge guide and the damper stop for closing on the hinge guide.

During the opening of the door, near the opened position, the damper stop for opening on the hinge guide passes the damper stop for opening on the hinge body, whereby the contact surface of the damper rests on the damper stop for opening on the hinge body, whereas the load on the damper stop for opening on the hinge guide is relieved.

During the closing of the door, near the closed position, the damper stop for closing on the hinge guide passes the damper stop for closing on the hinge body, whereby the contact surface of the damper rests on the damper stop for closing on the hinge body, whereas the load on the damper stop for closing on the hinge guide is relieved.

In the operating area of the damper, the damper fit surface and the damper head fit surface are constantly in contact with the two limiting surfaces:

- when opening the door, with the damper stop for opening on the hinge body and with the damper stop for opening on the hinge guide;
- when closing the door, with the damper stop for closing on the hinge body and with the damper stop for closing on the hinge guide.

A spring fit is installed at the upper part of the hinge body. The spring fit may be made of any material, while preferably it is made of plastic material. The spring fit is removable, but is fixed in the hinge body.

The latch is mounted on the hinge body with a fixed pivot point. The kinematics of the movement of all the components of the device according to this invention is determined by the position of

- the mounting axle of the latch to the hinge body, which enables the rotation of the latch around the axle; and
- the axle of the pivot point of the connecting link.

The other side of the latch is intended for mounting the door on the appliance and at the same time transferring the load from the door to the appliance, as well as providing the load-bearing function of the door. A door locking part is mounted on the latch to prevent the door from dropping down during closing.

One or more dampers, preferably one damper, is installed in the device according to the invention. A damper is preferably installed in the hinge guide.

The essence of the invention is further explained below with the description of the embodiment and attached figures, whereby the figures are part of this patent application and show the following:

FIG. 1 shows a latch 1, a connecting link 2, a hinge guide 3, a damper head 4, a damper 5, a hinge body 6, a spring fit 7 and a spring 8.

Figure 2:
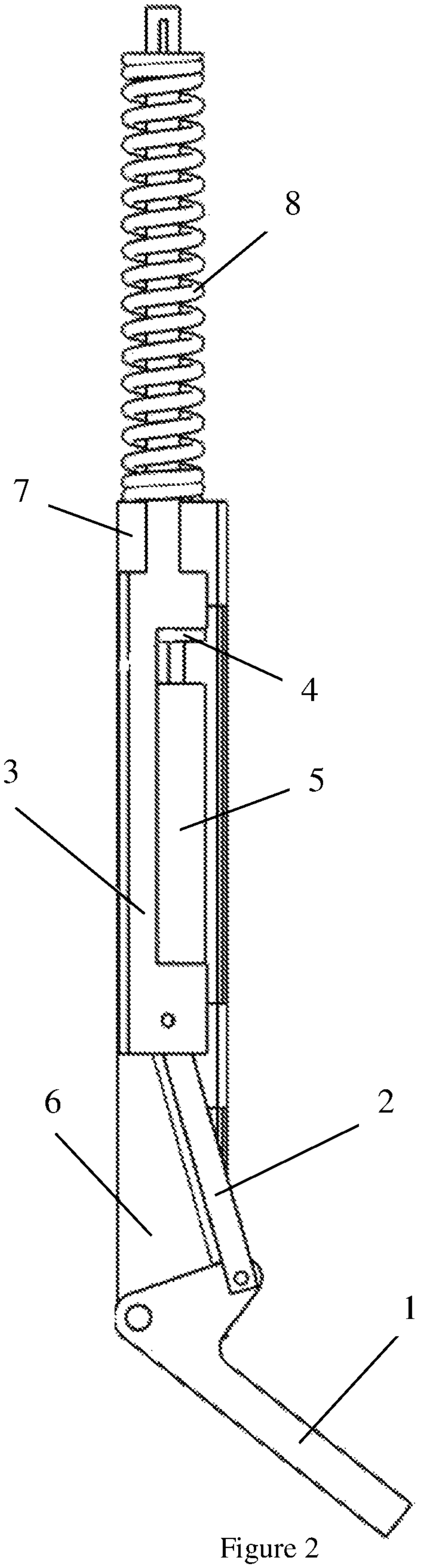

FIG. 2 shows a latch 1, a connecting link 2, a hinge guide 3, a damper head 4, a damper 5, a hinge body 6, a spring fit 7 and a spring 8.

Figure 3:
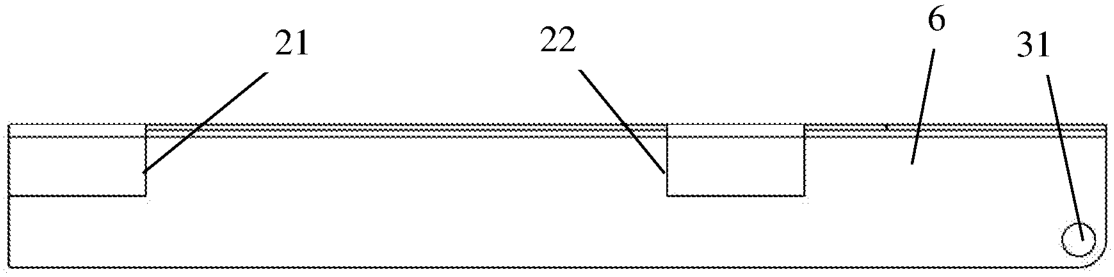

FIG. 3 shows a hinge body 6, a damper stop 21 for closing on the hinge body, a damper stop 22 for opening on the hinge body and a pivot point 31 of the latch 1.

Figure 4:
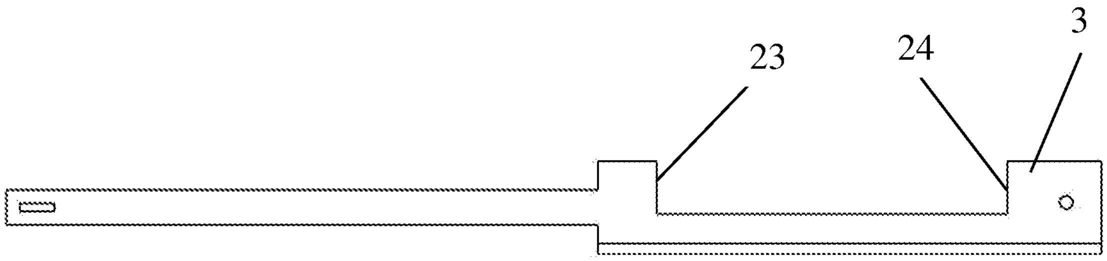

FIG. 4 shows a hinge guide 3, a damper stop 23 for opening on the hinge guide 3, a damper stop 24 for closing on the hinge guide 3.

Figure 5:
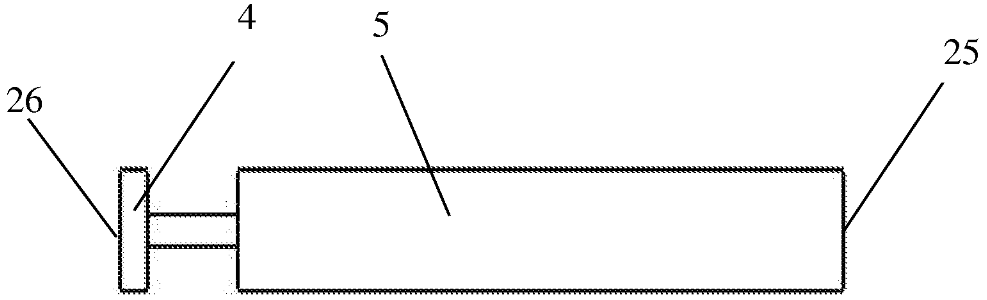

FIG. 5 shows a damper head 4, a damper 5, a damper fit surface 25 and a damper head fit surface 26.

Figure 6:
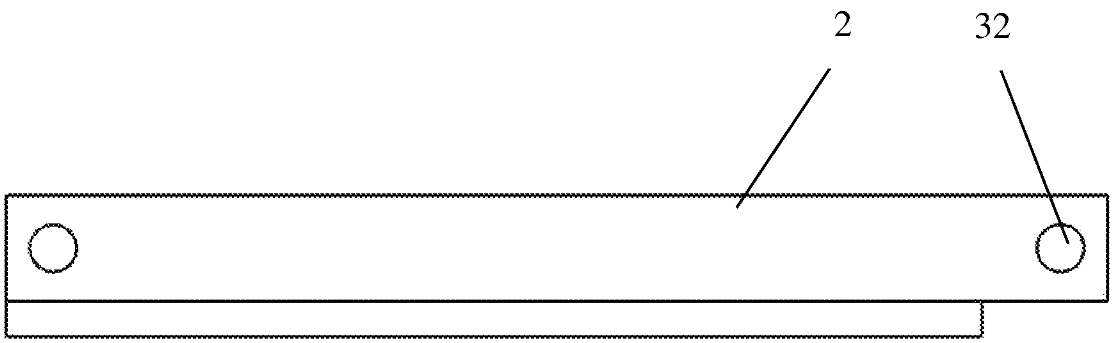

FIG. 6 shows a connecting link 2 and a pivot point 32 of the connecting link 2.

Figure 7:
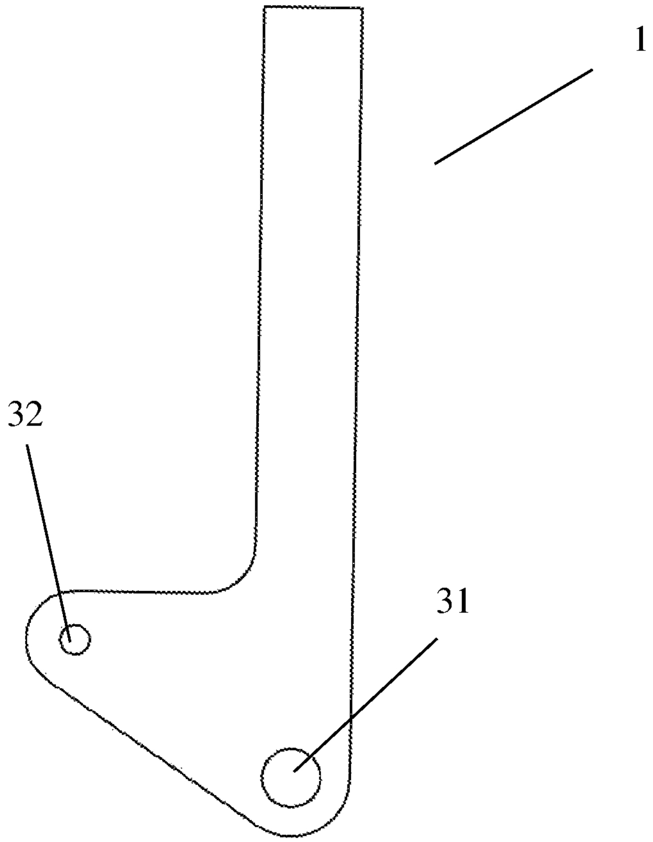

FIG. 7 shows a latch 1, a pivot point 31 of the latch 1 and a pivot point 32 of the connecting link 2.

Figure 8:
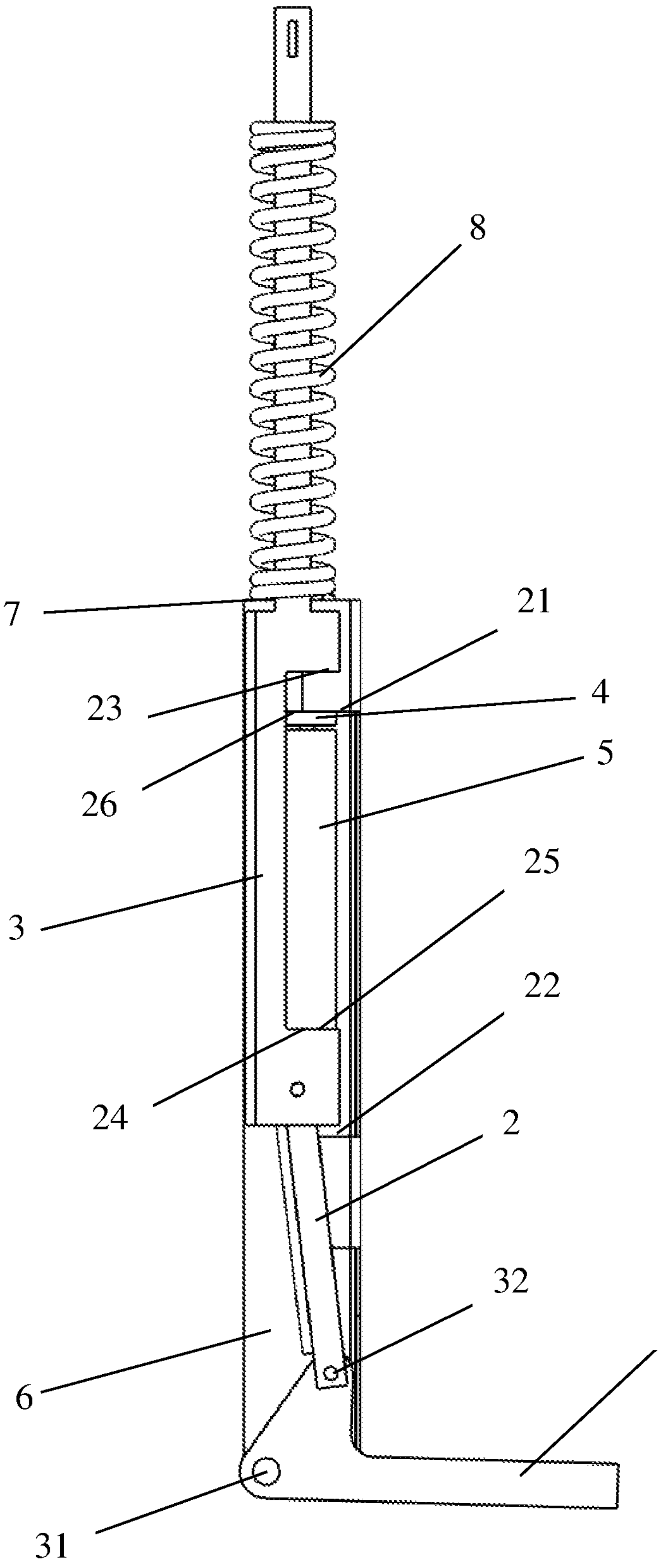

FIG. 8 shows a latch 1, a connecting link 2, a hinge guide 3, a damper head 4, a damper 5, a hinge body 6, a position for spring fit 7, a spring 8, a damper stop 21 for closing 21 on the hinge body 6, a damper stop 22 for opening on the hinge body 6, a damper stop 23 for opening on the hinge guide 3, a damper stop 24 for closing on the hinge guide 3, a damper fit surface 25, a damper head fit surface 26, a pivot point 31 of the latch 1 and a pivot point 32 of the connecting link 2.

Figure 9:
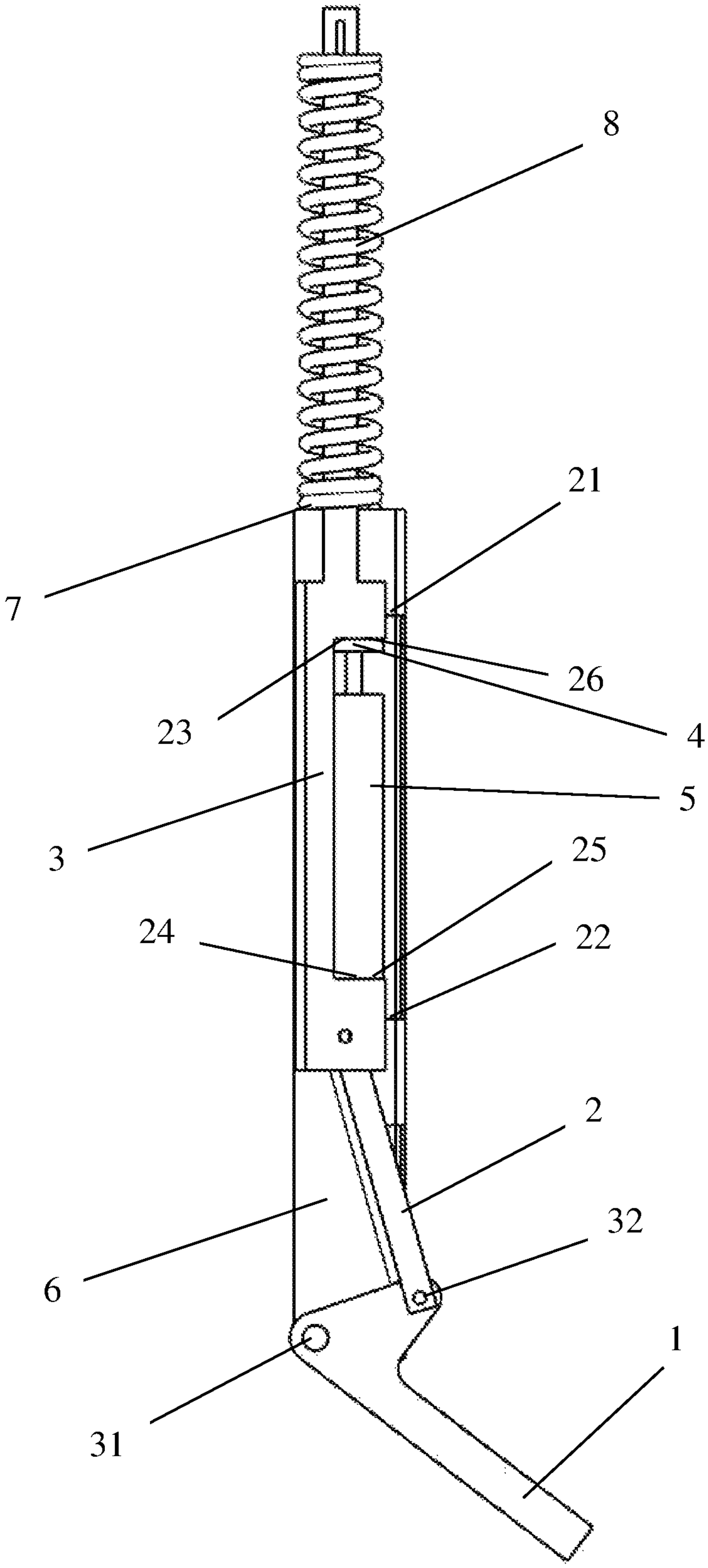

FIG. 9 shows a latch 1, a connecting link 2, a hinge guide 3, a damper head 4, a damper 5, a hinge body 6, a position for spring fit 7, a spring 8, a damper stop 21 for closing on the hinge body 6, a damper stop 22 for opening on the hinge body 6, a damper stop 23 for opening on the hinge guide 3, a damper stop 24 for closing on the hinge guide 3, a damper fit surface 25, a damper head fit surface 26, a pivot point 31 of the latch 1 and a pivot point 32 of the connecting link 2.

Figure 10:
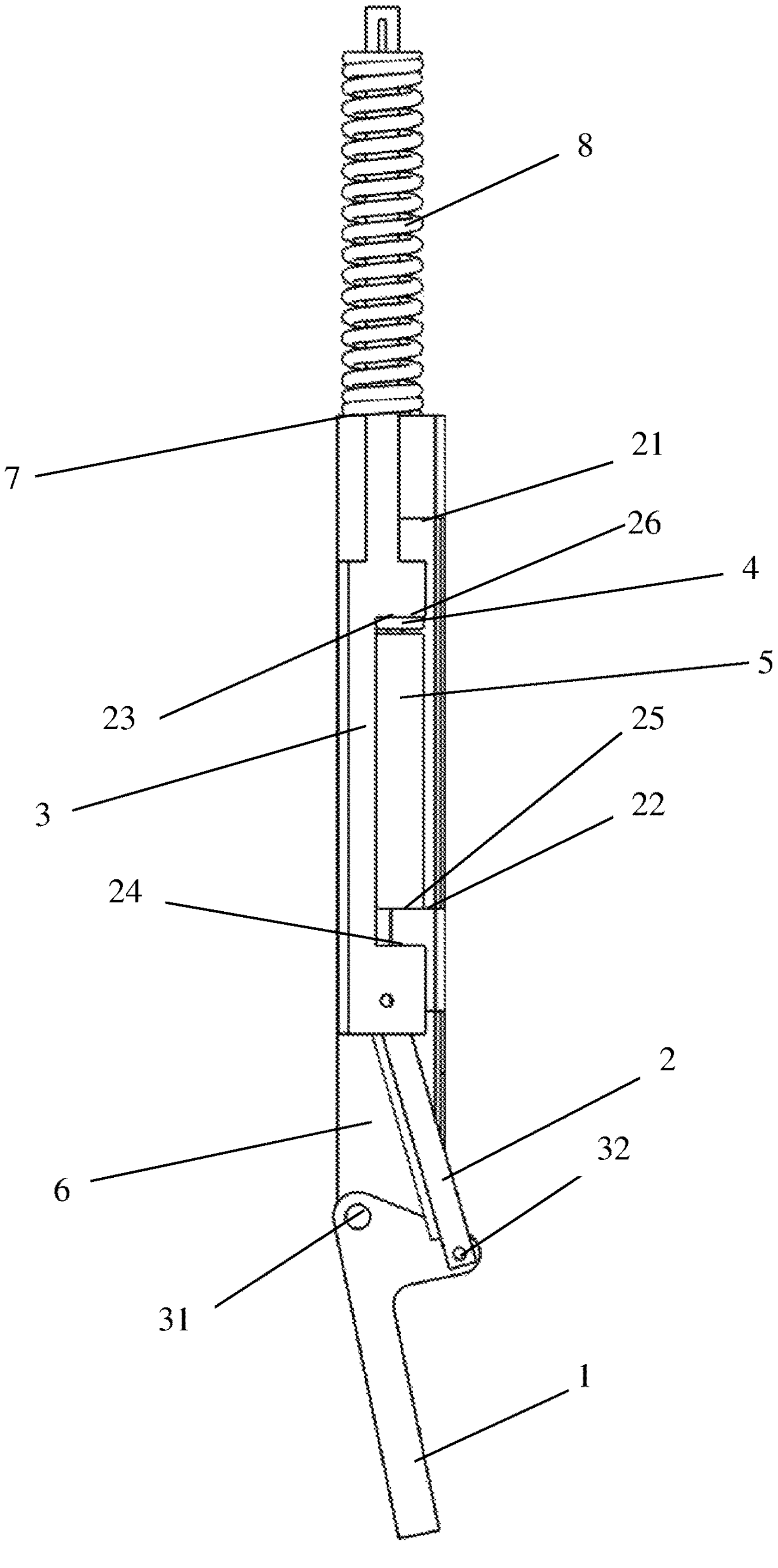

FIG. 10 shows a latch 1, a connecting link 2, a hinge guide 3, a damper head 4, a damper 5, a hinge body 6, a position for spring fit 7, a spring 8, a damper stop 21 for closing on the hinge body 6, a damper stop 22 for opening on the hinge body 6 22, a damper stop 23 for opening on the hinge guide 3, a damper stop 24 for closing on the hinge guide 3, a damper fit surface 25, a damper head fit surface 26, a pivot point 31 of the latch 1 and a pivot point 32 of the connecting link 2.

EXEMPLARY EMBODIMENT

The object of the invention in the exemplary embodiment is used for controlled opening and closing of an oven door. FIGS. 1 and 2 show the assembled object of the invention in the position of partial closure of an oven door.

FIG. 3 shows a hinge body 6. FIG. 4 shows a hinge guide 3. FIG. 5 shows a damper 5. FIG. 6 shows a connecting link 2, and FIG. 7 shows a latch 1.

The complete hinge is shown in a closed position in FIG. 8, in a neutral position in FIG. 9 and in an opened position in FIG. 10. One damper 5 is installed in the hinge guide 3. The damper 5 contributes to a soft closing of the door.

The hinge comprises: a latch 1, a connecting link 2, a hinge guide 3, a damper 5, a hinge body 6, a spring fit 7, a spring 8, a pivot point 31 of the latch 1 and a pivot point 32 of the connecting link 2.

The hinge further comprises: a damper stop 21 for closing on the hinge body 6, a damper stop 22 for opening on the hinge body 6, a damper stop 23 for opening on the hinge guide 3 and a damper stop 24 for closing on the hinge guide 3.

The latch 1 is rotatable in relation to the hinge body 6 and the connecting link 2. Force is applied to the connecting link 2 through the hinge guide 3, which causes the rotation of the latch 1 in relation to the hinge body 6. The damper 5 is used to limit the movement speed of the hinge guide 3 in certain positions, whereby the damper 5 comes into contact with limiting surfaces through the damper fit surface 25 and the damper head fit surface 26.

The contact surfaces of the damper, i.e., the damper fit surface 25 and the damper head fit surface 26, are always in contact with two of the corresponding limiting surfaces, i.e. two of the corresponding damper stops 21, 22, 23 and 24. In the closed position the damper fit surface 25 is in contact with the damper stop 24 for closing on the hinge guide 3 and the damper head fit surface 26 is in contact with the damper stop 21 for closing on hinge body 6, in opened position the damper fit surface 25 is in contact with the damper stop 22 for opening on the hinge body 6 and the damper head fit surface 26 is in contact with the damper stop 23 for opening on the hinge guide 3, and in a neutral area of functioning of the hinge, the damper fit surface 25 is constantly in contact with the damper stop 24 for closing on the hinge guide 3 and the damper head fit surface 26 is constantly in contact with the damper stop 23 for opening on the hinge guide 3. The damper 5 constantly applies force in the direction of extension or to increase the distance between the damper fit surface 25 and the damper head fit surface 26, whereas the hinge guide 3 is dimensioned in such a way that the distance between the damper stop 23 for opening on the hinge guide 3 and the damper stop 24 for closing on the hinge guide 3 is smaller than the maximum distance between the damper fit surface 25 and the damper head fit surface 26.

The latch 1 is mounted on the hinge body 6 with a pivot point 31 of the latch 1. The other side of the latch 1, i.e., the side near the latch head, is intended for mounting the door on the appliance and at the same time transferring the load from the door to the appliance, as well as providing the load-bearing function of the door. A door locking part is mounted on the latch 1 to prevent the door from dropping down during closing.

It is self-evident that the above-described invention can be also used in other particular form not changing the substance of the invention.

The invention claimed is:

1. A door hinge for use in household appliances, wherein the door hinge comprises a latch for mounting a door onto an appliance, a connecting link for connecting a hinge guide with the latch via a pivot point of the connecting link, a damper, a hinge body, a spring fit, a spring, and a pivot point of the latch;

wherein the latch is connected to the hinge body via the pivot point, wherein the damper is installed in the interior of the hinge guide located in the interior of the hinge body and movably connected to the hinge body, and wherein the damper comprises a damper fit surface and a damper head fit surface;

wherein the hinge body is provided with a damper stop for closing and a damper stop for opening, and wherein the hinge guide is provided with a damper stop for opening and a damper stop for closing;

wherein the damper stops are formed in such a way that, when moving the hinge from a closed position to an opened position and vice versa, free movement of the damper stops on the hinge guide past the damper stops on the hinge body is enabled;

characterised in that the hinge guide is dimensioned in such a way that a distance between the damper stop for opening and the damper stop for closing on the hinge guide is smaller than a distance of the maximum extension of the damper between the damper fit surface and the damper head fit surface when no force is acting on the damper, thereby enabling the damper fit surface and the damper head fit surface to always be in contact with two of the corresponding damper stops, namely, in the closed position the damper fit surface is in contact with the damper stop for closing on the hinge guide and the damper head fit surface is in contact with the damper stop for closing on the hinge body, in opened position the damper fit surface is in contact with the damper stop for opening on the hinge body and the damper head fit surface is in contact with the damper stop for opening on the hinge guide, and in a neutral area of functioning of the hinge, the damper fit surface is constantly in contact with the damper stop for closing on the hinge guide and the damper head fit surface is constantly in contact with the damper stop for opening on the hinge guide; and whereby the damper in the initial position constantly applies force to increase the distance between the damper fit surface and the damper head fit surface, thereby enabling a controlled door closing and opening.

2. The door hinge according to claim 1, characterised in that only one damper is installed in the interior of the hinge guide.

3. The door hinge according to claim 1, characterised in that the damper is installed in the device in such a manner that it does not increase the exterior dimensions of the door hinge, but is installed in the interior of the hinge guide that is movably connected to the hinge body.

4. The door hinge according to claim 1, characterised in that during the opening of the door, near the opened position, the damper stop for opening on the hinge guide passes the damper stop for opening on the hinge body, whereby the contact surface of the damper is resting on the damper stop for opening on the hinge body, whereas the load on the damper stop for opening on the hinge guide is relieved.

5. The door hinge according to claim 1, characterised in that during the closing of the door, near the closed position, the damper stop for closing on the hinge guide passes the damper stop for closing on the hinge body, whereby the contact surface of the damper is resting on the damper stop for closing on the hinge body, and whereas the load on the damper stop for closing on the hinge guide is relieved.

6. The door hinge according to claim 1, characterised in that the kinematics of the movement of all the components are determined by the position of the pivot point of the latch and the pivot point of the connecting link.

* * * * *